US008215353B2

(12) United States Patent
Collette et al.

(10) Patent No.: US 8,215,353 B2
(45) Date of Patent: Jul. 10, 2012

(54) STUDS FOR A TIRE

(75) Inventors: Jean Joseph Victor Collette, Arlon (BE); Andre Cuny, Habay La Neuve (BE); Per Elinar Detterman, Segeltorp (SE)

(73) Assignee: The Goodyear Tire & Rubber Company, Akron, OH (US)

( * ) Notice: Subject to any disclaimer, the term of this patent is extended or adjusted under 35 U.S.C. 154(b) by 492 days.

(21) Appl. No.: 12/582,143

(22) Filed: Oct. 20, 2009

(65) Prior Publication Data

US 2011/0088822 A1   Apr. 21, 2011

(51) Int. Cl.
B60C 11/16   (2006.01)
(52) U.S. Cl. ........................................................ 152/210
(58) Field of Classification Search .................. 152/210, 152/211, 212; D12/608
See application file for complete search history.

(56) References Cited

U.S. PATENT DOCUMENTS

| | | | |
|---|---|---|---|
| 1,361,078 A | 12/1920 | Lynn | |
| 1,395,162 A * | 10/1921 | Stroud | 152/175 |
| 2,217,122 A | 10/1940 | Lowry | 152/167 |
| 2,572,996 A * | 10/1951 | Dunlap | 152/210 |
| 3,179,146 A * | 4/1965 | Edsmar | 152/210 |
| 3,258,835 A | 7/1966 | Boggild et al. | 29/212 |
| 3,672,421 A | 6/1972 | Anderson | 152/208 |
| 3,837,386 A | 9/1974 | Lejeune | 152/167 |
| 3,872,908 A | 3/1975 | Einarsson | 152/208 |
| 3,889,735 A | 6/1975 | Salakari | 152/210 |
| 3,942,572 A | 3/1976 | Crandall | 152/208 |
| 4,036,272 A | 7/1977 | Lee | 152/210 |
| 4,076,065 A * | 2/1978 | Somers | 152/210 |
| 4,619,301 A | 10/1986 | Hiroki | 152/210 |
| 4,838,329 A | 6/1989 | Ohuchi et al. | 152/210 |
| 4,865,100 A * | 9/1989 | Linden et al. | 152/210 |
| 5,164,027 A * | 11/1992 | Omi | 152/210 |
| 5,221,379 A | 6/1993 | Nicholas | 152/212 |
| 5,603,367 A | 2/1997 | Watanabe | 152/209 R |
| 5,609,700 A | 3/1997 | West | 152/210 |
| 5,707,463 A | 1/1998 | Hansen | 152/210 |
| 5,800,649 A | 9/1998 | Eromaki | 156/114 |
| 6,253,468 B1 * | 7/2001 | Hirota | 36/67 D |
| 6,374,886 B1 | 4/2002 | Eromaki | 152/210 |
| 6,779,571 B1 | 8/2004 | Kasparov | 152/210 |
| D551,614 S * | 9/2007 | Liukkula et al. | D12/608 |

(Continued)

FOREIGN PATENT DOCUMENTS

CH         565055 A  *  8/1975

(Continued)

OTHER PUBLICATIONS

Machine translation for German 1,202,156 (no date).*

(Continued)

*Primary Examiner* — Steven D Maki
(74) *Attorney, Agent, or Firm* — Robert N. Lipcsik

(57) ABSTRACT

A tire includes a carcass, a tread band having a radially outer tread surface and a plurality of radially extending recesses, and an anti-slip structure disposed in one of the radially extending recesses. The anti-slip structure includes a first end portion, a second triangular middle portion, and a third triangular end portion. The third end portion includes three radially extending projections for providing traction over ice. The shape of the radially extending recess corresponds to the shape of the anti-slip structure such that the anti-slip structure is both radially and rotationally secured within the recess relative to the tread band of the tire.

2 Claims, 3 Drawing Sheets

U.S. PATENT DOCUMENTS

| | | | |
|---|---|---|---|
| 7,338,571 B2 | 3/2008 | Brivio et al. | 156/114 |
| 2004/0163746 A1* | 8/2004 | Eromaki | 152/210 |
| 2006/0213595 A1 | 9/2006 | Volt et al. | 152/210 |
| 2007/0144646 A1 | 6/2007 | Mancia et al. | 152/210 |

FOREIGN PATENT DOCUMENTS

| | | | |
|---|---|---|---|
| DE | 1850309 U | * | 4/1962 |
| DE | 1202156 B | * | 9/1965 |
| DE | 37 39 422 A1 | | 5/1988 |
| EP | 383401 A1 | * | 8/1990 |
| GB | 1407404 A | * | 9/1975 |
| JP | 58-101806 A | * | 6/1983 |
| JP | 63-106116 A | * | 5/1998 |
| WO | WO 90/15725 | | 12/1990 |

OTHER PUBLICATIONS

European Search Report—Jan. 10, 2011.

* cited by examiner

STUDS FOR A TIRE

FIELD OF THE INVENTION

The present invention relates generally to studs for a tire and, more particularly, to studs for a winter tire.

BACKGROUND OF THE INVENTION

Since the advent of the powered wheel, man has searched for means to enhance the traction of the wheel with the surface upon which it operates. Early on, the wide steel driving wheels of steam powered traction machinery were equipped with massive steel lugs, which bit into the earth and gave the wheel the traction required to pull a number of breaking or turning plows through the earth. The wide wheels were necessary to provide the area required and support the tractor against sinking into the earth. The lugs provided the grip in the soil required to pull the plows.

The coming of the horseless carriage created an entirely new set of problems, as it was nothing more than a motorized adaptation of a horse-drawn vehicle, having free-turning wheels, which were meant to be pulled across the earth, rather than propelled by the powered rotation of the wheels. It was soon discovered that the steel band, or tire, that encircled the wooden wheel rims, was only suitable for use on hard-packed and dry surfaces. From this discovery, there evolved the wider solid rubber and subsequently the pneumatic tire.

Since the evolution of the pneumatic tire, great effort has been dedicated in the search for means to improve the traction of the driving wheels of all manner of vehicles upon the surface and under the conditions which they must operate. Water, mud, and snow are three of the most difficult conditions to address with a modern vehicle tire. Each of these conditions requires a specific tire tread suited either to "channelize" the water away from the tire or grip the soft or slippery surface and either bring more material under the tread area or compact the material to provide a suitably stable driving surface. These conditions however, pale by comparison with the problems encountered when operating a wheeled vehicle on an ice covered surface.

No amount of tread, ribs, bars, and/or other such means are effective upon a surface of solid ice. While time-honored detachable tire chains or cleats provide a measure of traction under these conditions, their use has never been popular due to the difficulty of installation/removal and the bone-shaking ride which they impart to a vehicle employing them.

In an attempt to solve these problems, the conventional "studded tire," which comprises a tread area which includes a number of hard stud-like projections which extend a short distance beyond the face of the tread to slightly penetrate the surface of the ice and thereby provide a limited mount of traction between tire and iced roadway, was developed. However, a studded tire with improved ice traction over conventional studded tires would be desirable.

SUMMARY OF INVENTION

A tire in accordance with the present invention includes a carcass, a tread band having a radially outer tread surface and a plurality of radially extending recesses, and an anti-slip structure disposed in one of the radially extending recesses. The anti-slip structure includes a first end portion, a second triangular middle portion, and a third triangular end portion. The third end portion includes three radially extending projections for providing traction over ice. The shape of the radially extending recess corresponds to the shape of the anti-slip structure such that the anti-slip structure is both radially and rotationally secured within the recess relative to the tread band of the tire.

In accordance with another aspect of the present invention, the three radially extending projections each have semi-spherical end portions for engaging the ice.

In accordance with still another aspect of the present invention, the three radially extending projections each extend obliquely relative to the radially outer tread surface.

In accordance with yet another aspect of the present invention, the three radially extending projections each extend perpendicularly relative to the radially outer tread surface.

In accordance with still another aspect of the present invention, the first end portion of the anti-slip structure has a circular shape.

In accordance with yet another aspect of the present invention, the first end portion of the anti-slip structure has a triangular shape.

In accordance with still another aspect of the present invention, the third triangular end portion is wider than the second triangular middle portion.

In accordance with yet another aspect of the present invention, the three radially extending projections are pins inserted into corresponding recesses in the third triangular end portion.

DEFINITIONS

The following definitions are controlling for the disclosed invention.

"Apex" refers to a wedge of rubber placed between the carcass and the carcass turnup in the bead area of the tire, usually used to stiffen the lower sidewall of the tire.

"Aspect ratio" of the tire means the ratio of its section height (SH) to its section width (SW) multiplied by 100% for expression as a percentage.

"Annular" means formed like a ring.

"Axial" and "axially" mean lines or directions that are parallel to the axis of rotation of the tire; synonymous with "lateral" and "laterally."

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire.

"Belt structure" means at least two annular layers or plies of parallel cords, woven or unwoven, underlying the tread, unanchored to the bead, and having both left and right cord angles in the range from 17 degrees to 27 degrees with respect to the equatorial plane of the tire.

"Bias ply tire" means a tire having a carcass with reinforcing cords in the carcass ply extending diagonally across the tire from bead core to bead core at about a 25 degree to 50 degree angle with respect to the equatorial plane (EP) of the tire. Cords run at opposite angles in alternate layers.

"Breakers" refers to at least two annular layers or plies of parallel reinforcement cords having the same angle with reference to the equatorial plane of the tire as the parallel reinforcing cords in carcass plies.

"Buffed" means a procedure whereby the surface of an elastomeric tread or casing is roughened. The roughening removes oxidized material and permits better bonding.

"Building Drum" refers to a cylindrical apparatus on which tire components are placed in the building of a tire. The "Building Drum" may include apparatus for pushing beads onto the drum, turning up the carcass ply ends over the beads, and for expanding the drum for shaping the tire components into a toroidal shape.

"Carcass" means the tire structure apart from the belt structure, tread, undertread, and sidewall rubber over the plies, but including the beads.

"Casing" means the carcass, belt structure, beads, sidewalls, and all other components of the tire including a layer of unvulcanized rubber to facilitate the assembly of the tread, the tread and undertread being excluded. The casing may be new, unvulcanized rubber or previously vulcanized rubber to be fitted with a new tread.

"Center plane" means the plane perpendicular to the axis of rotation of the tread and passing through the axial center of the tread.

"Circumferential" means lines or directions extending along the perimeter of the surface of the annular tire parallel to the equatorial plane (EP) and perpendicular to the axial direction.

"Chafers" refers to narrow strips of material placed around the outside of the bead to protect cord plies from the rim, distribute flexing above the rim, and to seal the tire.

"Chippers" mean a reinforcement structure located in the bead portion of the tire.

"Cord" means one of the reinforcement strands of which the plies in the tire are comprised.

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organisation—Standards Manual and the term design rim means the same as the standard measurement rims. In Japan, the standard organization is The Japan Automobile Tire Manufacturer's Association.

"Design rim width" is the specific commercially available rim width assigned to each tire size and typically is between 75% and 90% of the specific tire's section width.

"Equatorial plane (EP)" means the plane perpendicular to the tire's axis of rotation and passing through the center of its tread.

"Filament" refers to a single yarn.

"Flipper" refers to reinforcing fabric around the bead wire for strength and to tie the bead wire into the tire body.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Inboard side" means the side of the tire nearest the vehicle when the tire is mounted on a wheel and the wheel is mounted on the vehicle.

"Inner" means toward the inside of the tire and "outer" means toward its exterior.

"Lateral" means an axial direction.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Net contact area" means the total area of ground contacting tread elements between the lateral edges around the entire circumference of the tread divided by the gross area of the entire tread between the lateral edges.

"Net-to-gross ratio" means the ratio of the tire tread rubber that makes contact with a hard flat surface while in the footprint, divided by the area of the tread in the footprint, including non-contacting portions such as grooves.

"Nominal rim diameter" means the average diameter of the rim flange at the location where the bead portion of the tire seats.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Outboard side" means the side of the tire farthest away from the vehicle when the tire is mounted on a wheel and the wheel is mounted on the vehicle.

"Pantographing" refers to the shifting of the angles of cord reinforcement in a tire when the diameter of the tire changes, e.g. during the expansion of the tire in the mold.

"Ply" means a continuous layer of rubber-coated parallel cords.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid or gaseous matter, usually air, that sustains the vehicle load.

"Radial" and "radially" mean directions radially toward or away from the axis of rotation of the tire.

"Section height" means the radial distance from the nominal rim diameter to the outer diameter of the tire at its equatorial plane.

"Shoulder" means the upper portion of sidewall just below the tread edge. Tread shoulder or shoulder rib means that portion of the tread near the shoulder.

"Tread Width" means the arc length of the tread surface in the axial direction, that is, in a plane parallel to the axis of rotation of the tire.

"Undertread" refers to a layer of rubber placed between a reinforcement package and the tread rubber in a tire.

"Unit tread pressure" means the radial load borne per unit area (square centimeter or square inch) of the tread surface when that area is in the footprint of the normally inflated and normally loaded tire.

"Wedge" refers to a tapered rubber insert, usually used to minimize curvature of a reinforcing component, e.g. at a belt edge.

"Wings" means the radial inward extension of the tread located at axial extremes of the tread, the inner surface of the wing being an extension of the inner casing contacting surface of the tread.

"Year-round" means a full calendar year through each season. For example, a snow tire is not designed for year-round use since it creates objectionable noise on dry road surfaces and is designed to be removed when the danger of snow is passed.

BRIEF DESCRIPTION OF THE DRAWINGS

The invention will be described by way of example and with reference to the accompanying drawings in which.

DETAILED DESCRIPTION OF AN EXAMPLE EMBODIMENT OF THE PRESENT INVENTION

Figure 1:
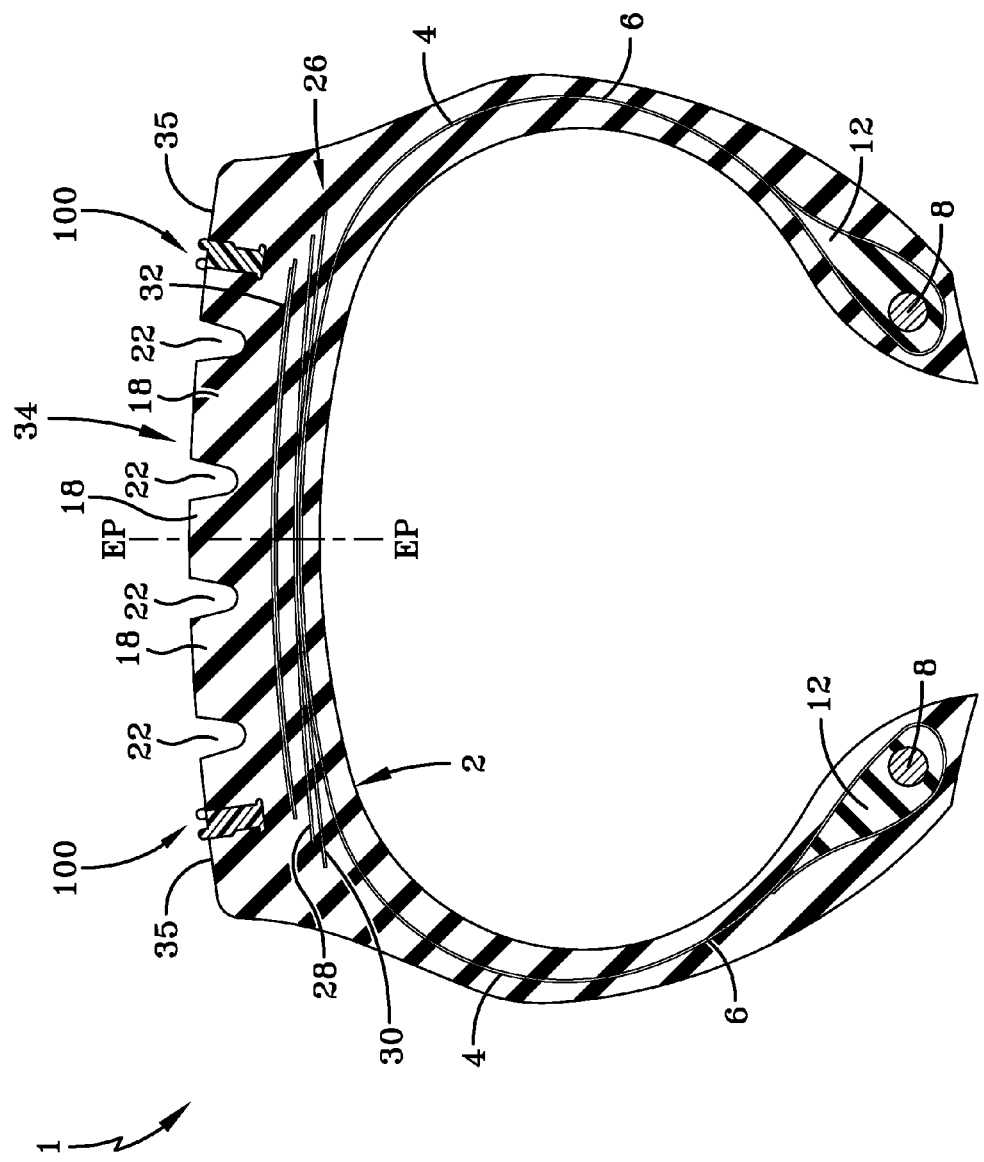
FIG. 1 is a schematic perspective view of an example tire for use with a structure in accordance with the present invention.

FIG. 1 shows a cross-section of an example tire 1 for use with the present invention. The tire 1 comprises a torus-shaped carcass 2, of the radial or of the cross-ply type, comprising a resistant structure which is formed by at least a rubberized fabric ply 4 reinforced with textile or metal cords and having turnup ends 6 each fixed to a pair of circumferentially unextendable, preferably metallic, annular core, known and referred to hereinbelow as reinforcing bead cores 8. The bead cores 8 are provided with rubber filling apexes 12. The zone of the example tire 1 comprising the bead core 8 and filling apex 12 forms the bead, intended for fixing the tire 1 to a corresponding mounting rim (not shown).

The carcass 2 has arranged on it, in a known manner, a surface 35 of a tread band 34 which is intended for the rolling contact of the example tire 1 on the ground and is provided with a raised pattern comprising grooves 22 formed in the thickness of the tread band 34 and defines a plurality of blocks and/or ribs 18. The combination of these structural elements, in various configurations, may produce different tread patterns which are generally optimized for different applications of the example tire 1.

Together with the carcass 2 of the example tire 1, a belt structure 26 is arranged on the crown of the carcass, in between the carcass ply 4 and the tread band 34, axially extending from one side to the other of the example tire, i.e. as wide as the tread band 34. The belt structure 26 may include at least two rubberized fabric strips 28, 30, radially superimposed with textile and/or metallic reinforcing cords parallel to one another in each strip, mutually intersecting with those of the adjacent strip and with respect to the equatorial plane EP of the example tire 1. The belt structure 26 may also include a radially outermost strip 32, or overlay, with textile and/or metallic reinforcing cords, oriented at about 0 degrees relative to a circumferential direction of the example tire 1.

The thickness of the tread band 34 may be between 8 mm and 24 mm, and more specifically, between 15 mm and 16 mm for passenger tires, between 8 mm and 11 mm for light truck tires, and between 18 mm and 24 mm for medium truck tires. The tread band 34 may be constructed of a compound generally suitable for winter usage, and specifically suited for winter usage with studs. The tread band 34 may have, inserted in it, a plurality of structures 100 in accordance with the present invention. The structures 100 may provide anti-slip elements for enhanced snow and ice traction and braking.

Figures 3, 4:
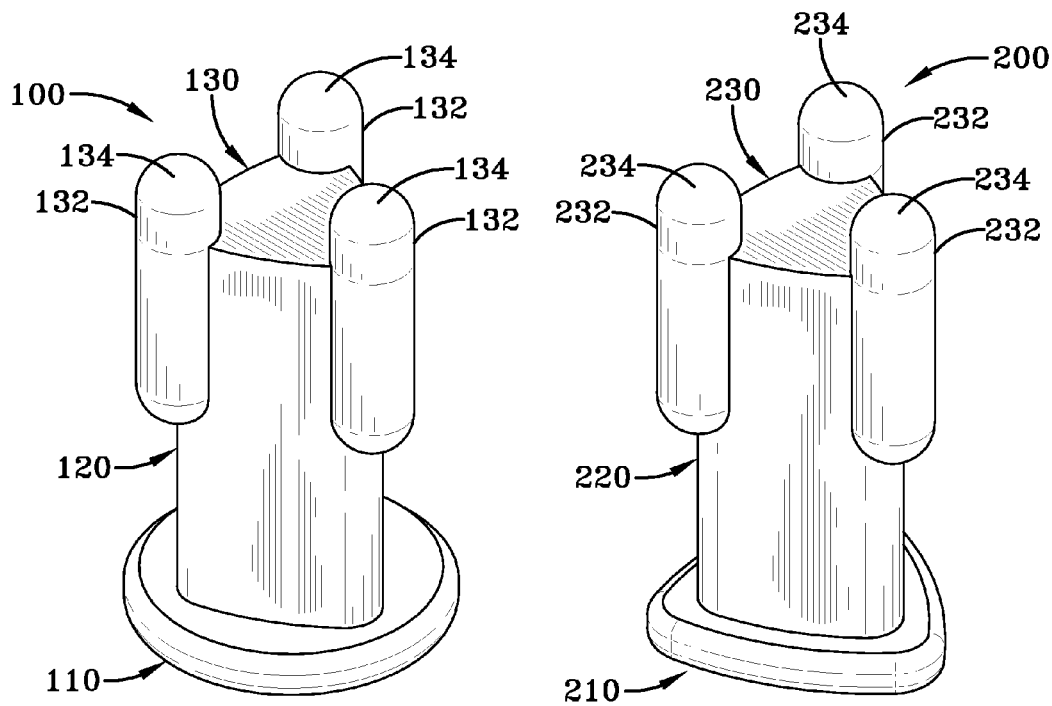
FIG. 3 is a schematic detail view of part of the structure of FIG. 2.
FIG. 4 is a schematic detail view of an alternative construction of part of the structure of FIG. 2.

As shown in FIG. 3, the structures 100 may be received in correspondingly shaped recesses 3 for securing the structures within the tread band 34. Each structure, or stud 100, includes a first circular end portion 110, a triangular second middle portion 120, and a triangular third end portion 130. The first portion 110 defines a circular flange portion for radially securing the stud 100, or providing "anchorage," within the radially extending recess 3 of the tread band 34. The structures 100 may be constructed of any suitably durable material, such as plastic.

Figure 2:
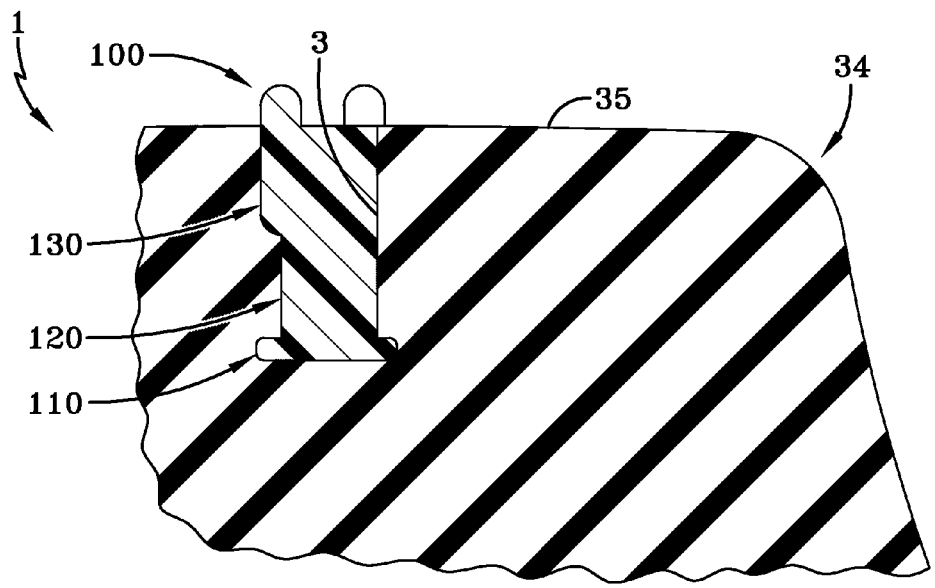
FIG. 2 is a schematic detail view of part of the tire of FIG. 1 with a structure in accordance with the present invention.

The third portion 130 of the structure 100 further includes three projections 132 extending radially outward (with respect to the tire 1) for providing traction over ice by increasing the number of biting points of a single stud. The projections 132 also provide a greater number of "biting" points for limiting road damage. The radially outer end portions 134 of the projections 132 may have a semi-spherical shape for further limiting road damage. The triangular configuration of the second and third portions 120, 130 (and the correspondingly shaped recess 3) maintain the rotational orientation of the structure 100 with respect to the tread band 34. The projections 132 may extend radially outward perpendicular to the surface 35 of the tread band 34 (FIGS. 1-2) or at an oblique angle to the surface 35 (not shown).

As shown in FIG. 4, alternative structures 200 may be received in correspondingly shaped recesses 3 for securing the structures within the tread band 34. Each structure, or stud 200, includes a first triangular end portion 210, a triangular second middle portion 220, and a triangular third end portion 230. The first portion 210 defines a triangular flange portion for radially securing the stud 200, or providing "anchorage," within the radially extending recess 3 of the tread band 34. The structures 200 may be constructed of any suitably durable material, such as plastic.

The third portion 230 of the structure 200 further includes three projections 232 extending radially outward (with respect to the tire 1) for providing traction over ice by increasing the number of biting points of a single stud. The radially outer end portions 234 of the projections 232 may have a semi-spherical shape for limiting road damage when engaging ice. The triangular configuration of the first, second, and third portions 210, 220, 230 (and the correspondingly shaped recess 3) maintain the rotational orientation of the structure 200 with respect to the tread band 34. The projections 232 may extend radially outward perpendicular to the surface 35 of the tread band 34 (FIG. 4) or at an oblique angle to the surface 35 (not shown).

Figure 5:
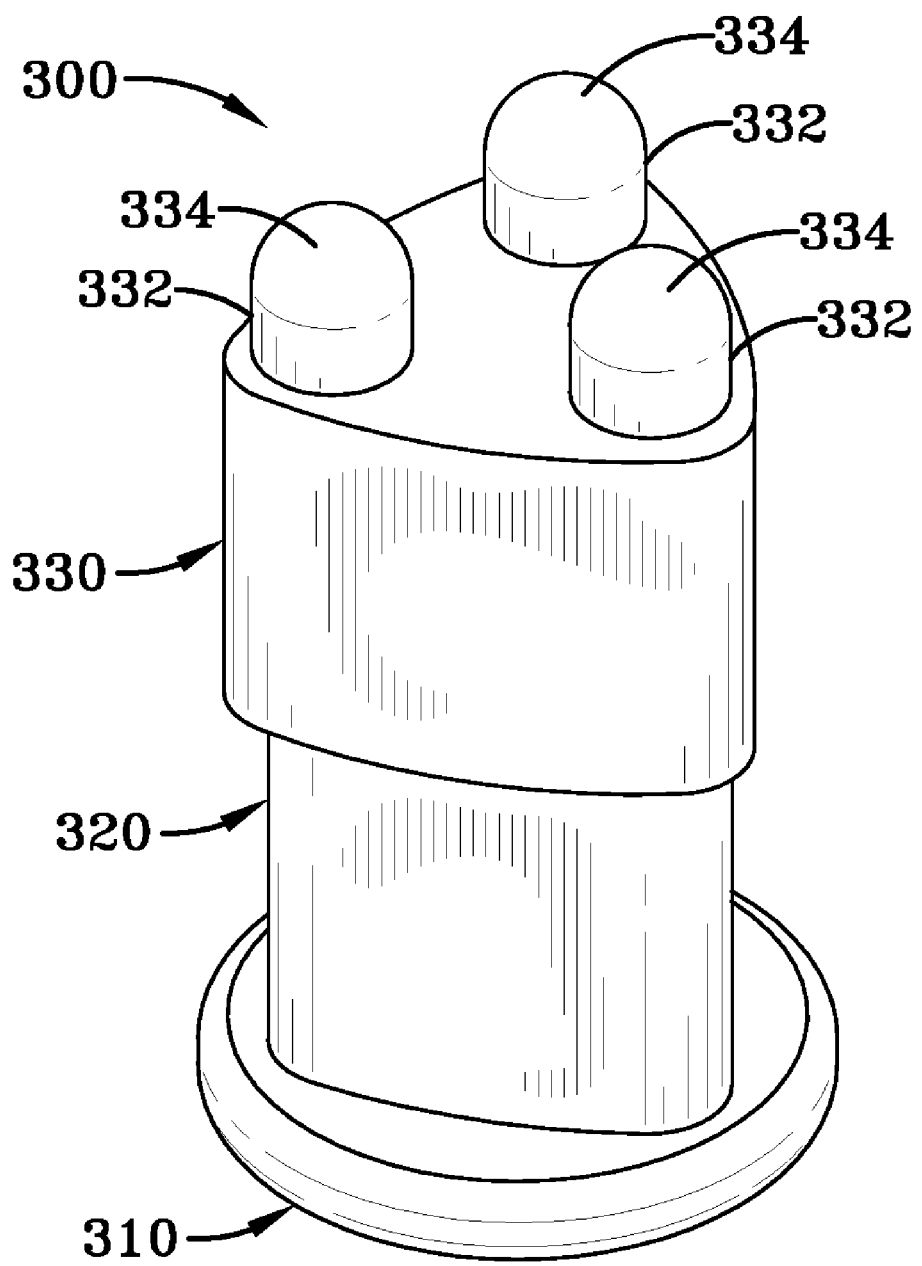
FIG. 5 is a schematic detail view of another alternative construction of part of the structure of FIG. 2.

As shown in FIG. 5, alternative structures 300 may be received in correspondingly shaped recesses 3 for securing the structures within the tread band 34. Each structure, or stud 300, includes a first circular end portion 310, a triangular second middle portion 320, and a triangular, wider third end portion 330. The first portion 310 defines a circular flange portion for, along with the wider third portion 330, radially securing the stud 300, or providing "anchorage," within the radially extending recess 3 of the tread band 34. The structures 300 may be constructed of any suitably durable material, such as plastic, and the projections 332 may be metal pins inserted into the third portion 330.

The third portion 330 of the structure 300 further includes three projections 332 extending radially outward (with respect to the tire 1) from the third portion 330 for providing traction over ice by increasing the number of biting points of a single stud. The radially outer end portions 334 of the projections 332 may have a semi-spherical shape for limiting road damage when engaging ice. The triangular configuration of the second and third portions 320, 330 (and the correspondingly shaped recess 3) maintain the rotational orientation of the structure 300 with respect to the tread band 34. The projections 332 may extend radially outward perpendicular to the surface 35 of the tread band 34 (FIG. 5) or at an oblique angle to the surface 35 (not shown).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. A tire comprising:
   a carcass;
   a tread band having a radially outer tread surface and a plurality of radially extending recesses; and
   an anti-slip structure disposed in one of the radially extending recesses, the structure including:
     a first end portion, the first end portion of the anti-slip structure having a circular shape;
     a second triangular middle portion; and
     a third triangular end portion, the third end portion including three radially
     extending projections for providing traction over ice, the shape of the radially extending recess corresponding to the shape of the anti-slip structure such that the anti-slip structure is both radially and rotationally secured within the recess relative to the tread band of the tire,
   the three radially extending projections being pins inserted into corresponding recesses in the third triangular end portion, the three radially extending projections each having semi-spherical end portions for engaging the ice, the three radially extending projections each extending obliquely relative to the radially outer tread surface.

2. The tire as set forth in claim 1 wherein the third triangular end portion is wider than the second triangular middle portion.

* * * * *